United States Patent
Nan et al.

[11] Patent Number: 5,990,975
[45] Date of Patent: Nov. 23, 1999

[54] DUAL SCREEN DISPLAYING DEVICE

[75] Inventors: Liu Po Nan; Wang Cheng Chung; Zeng-Chen Huang, all of Taoyuan, Taiwan

[73] Assignee: Acer Peripherals, Inc., Taoyuan, Taiwan

[21] Appl. No.: 08/755,068

[22] Filed: Nov. 22, 1996

[51] Int. Cl.$^6$ ................................................ H04N 5/445
[52] U.S. Cl. .................... 348/588; 348/563; 348/564; 348/565; 348/525
[58] Field of Search .................... 348/563, 564, 348/565, 566, 567, 569, 588, 553, 554, 525; 248/731, 725; H04N 5/445, 5/45, 5/46

[56] References Cited

U.S. PATENT DOCUMENTS

| | | | |
|---|---|---|---|
| 5,420,642 | 5/1995 | Baek | 348/565 |
| 5,467,144 | 11/1995 | Saeger | 348/566 |
| 5,680,177 | 10/1997 | Abe | 348/564 |
| 5,715,013 | 2/1998 | Kang | 348/564 |
| 5,726,715 | 3/1998 | Endress | 348/565 |
| 5,729,300 | 3/1998 | Ahn | 348/564 |

*Primary Examiner*—John K. Peng
*Assistant Examiner*—Wesner Sajous
*Attorney, Agent, or Firm*—Winston Hsu

[57] ABSTRACT

A dual screen displaying device for displaying two NTSC video signals on the left and right sides of a monitor is disclosed. The displaying device comprises two tuners for receiving wireless signals from an antenna and generating two video signals V1 and V2, two digitizing circuits for digitizing the video signals V1 and V2, a control circuit for merging the outputs of the two digitizing circuits, a digital-to-analog converter for converting the merged digitized signals back to a combined video signal, and a display control circuit for displaying the combined video signal. Asynchronous condition may happen when displaying different fields of the two video signals V1 and V2 in the same time. And the control circuit uses a storage method which controls the storage of a specific field of the video signal V2 or a data retrieval method which controls the retrieval of a specific field of the video signal V2 to solve the asynchronous problem.

15 Claims, 3 Drawing Sheets

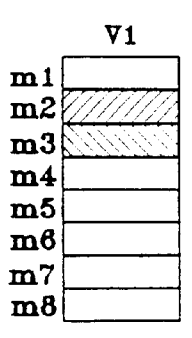
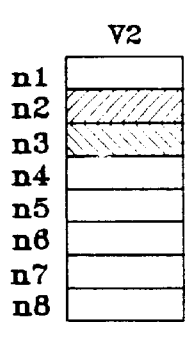
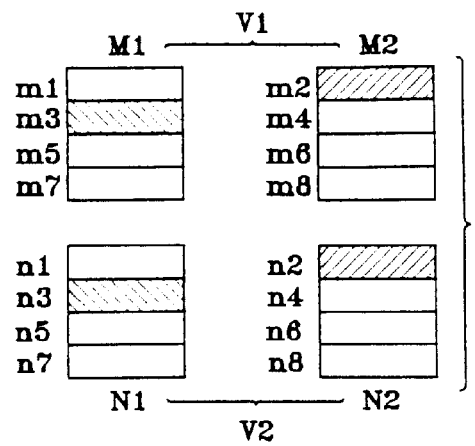
FIG. 2   FIG. 3
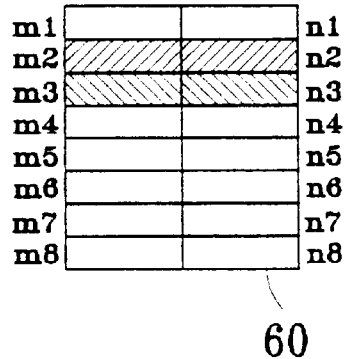
FIG. 4
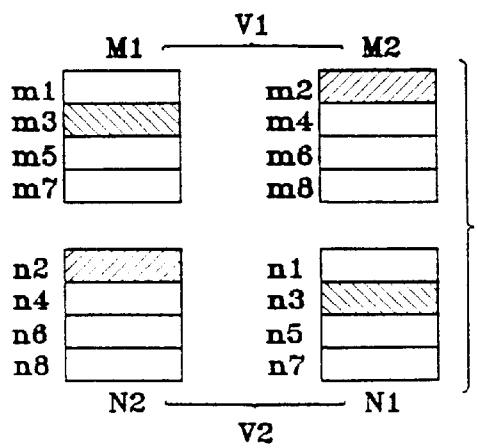
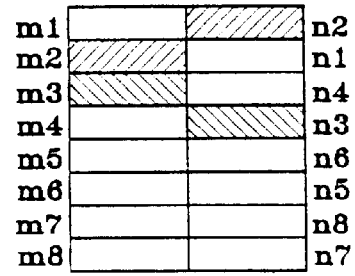
FIG. 5   FIG. 6

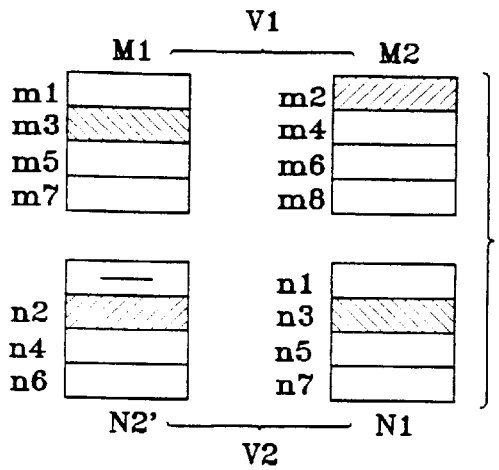
FIG. 7
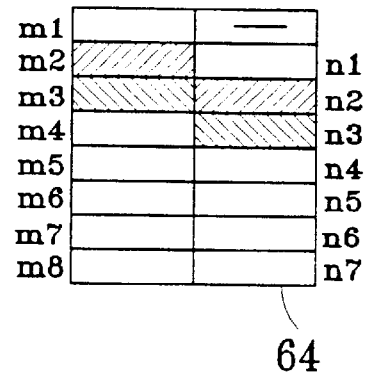
FIG. 8
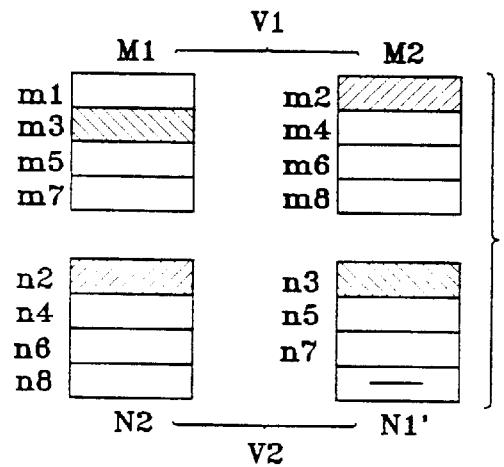
FIG. 9
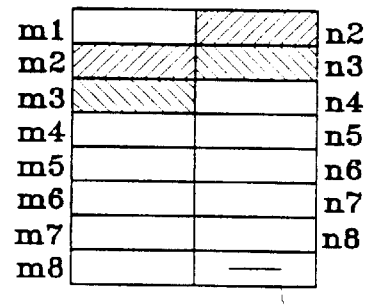
FIG. 10
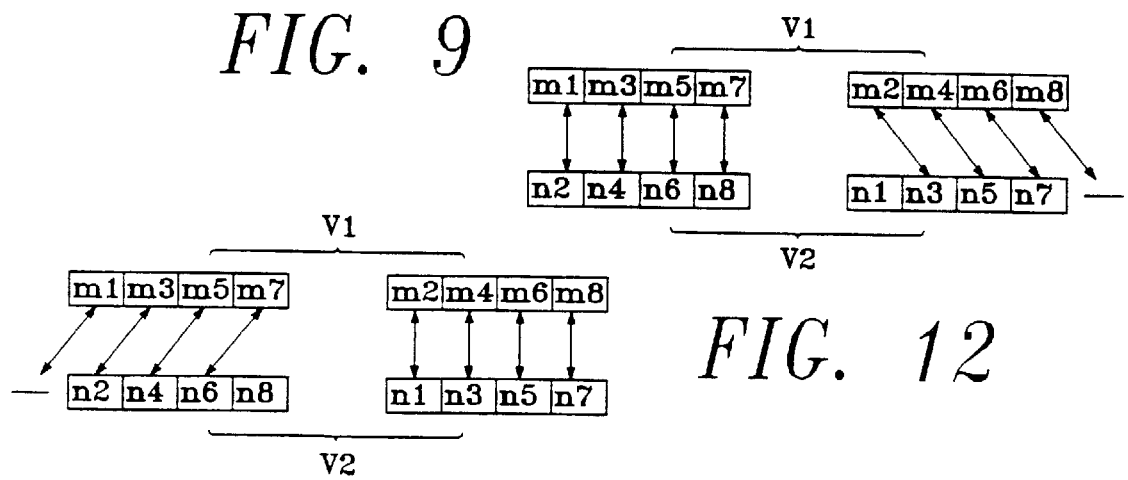
FIG. 11
FIG. 12

DUAL SCREEN DISPLAYING DEVICE

BACKGROUND OF THE INVENTION

1. Field of the Invention

The present invention relates to a displaying device, and more particularly, to a dual-screen displaying device for displaying two video signals on the left and right sides of a monitor.

2. Description of the Prior Art

Wide screen monitors of aspect ratio 16:9 have become more and more popular in the market. But traditional wide screen televisions can only display one video signal at a time. When displaying conventional 4:3 video frame of a NTSC video signal over a wide screen monitor, two blank areas will occur over the left and right sides of such a monitor. If two video frames generated by two incoming NTSC video signals can be displayed in the same time over the left and right sides of a wide screen monitor, the monitor users can then enjoy watching two TV programs at the same time while the distortion over each of the video frames is usually tolerable.

SUMMARY OF THE INVENTION

It is therefore a primary objective of the present invention to provide a dual screen displaying device for displaying two video signals over the left and right sides of a monitor at the same time.

It is a second objective of the present invention to provide a dual screen displaying device which not only allows displaying two video signals over the left and right sides of a monitor at the same time, but also allows displaying one video signal over a monitor just like traditional monitors.

Briefly, in a preferred embodiment, the present invention includes a displaying device for displaying a first video signal and a second video signal on the left and right sides of a monitor, each of the video signals comprising an even field and an odd field which form a video frame when the two fields are displayed together, each of the two fields comprising a predetermined number of line signals, the device comprising:

(1) a first digitizing circuit comprising:
   (a) a sync separator for separating sync signals out of the first video signal,
   (b) an analog-to-digital (A/D) converter for converting each line signal of the first video signal into a digitized signal, and
   (c) a line buffer for storing the digitized signal;

(2) a second digitizing circuit comprising:
   (a) a sync separator for separating sync signals out of the second video signal,
   (b) an analog-to-digital (A/D) converter for converting each line signal of the second video signal into a digitized signal,
   (c) a field buffer having a plurality of locations for sequentially storing the digitized signals converted from the line signals of one field of the second video signal, (3) a control circuit connected to the first and the second digitizing circuits comprising:
   (a) a sync identifier for identifying whether the incoming fields of the first and the second video signals are synchronous according to the sync signals generated by the sync separators of the first and the second digitizing circuits and generating an output;
   (b) a field buffer controller for controlling the storage of the digitized signals stored in the field buffer, wherein a first predetermined field of the second video signal is stored into the field buffer sequentially starting from a starting location of the field buffer, and a second predetermined field of the second video signal is stored into the field buffer according to the output of the sync identifier so that the two fields of the first and second video signals can be synchronously displayed over the monitor; and
   (c) a signal mixer for retrieving the digitized signal stored in the line buffer of the first digitizing circuit and one digitized signal out of the field buffer starting from the starting location of the field buffer in sequence to form a combined digitized signal;

(4) a digital-to-analog (D/A) converter for converting the combined digitized signal into a combined line signal; and (5) a display control circuit connected to the D/A converter for displaying the combined line signal over the monitor whereby the first and second video signals are displayed in sequence over the left and right sides of the monitor. The displaying device further comprises a display control switch having an output end connected to the display control circuit, a first input end connected to the D/A converter for receiving the combined line signal and a second input end for receiving the first video signal. The display control switch is used for selecting one of the two input ends so that the displaying device can either display both the first and second video signals in sequence over the left and right sides of the monitor or display only the first video signal over the monitor.

It is an advantage of the present invention that it provides a dual screen displaying device for displaying two video signals over the left and right sides of a monitor at the same time.

It is another advantage of the present invention that it provides a dual screen displaying device which not only allows displaying two video signals over the left and right sides of a monitor at the same time, but also allows displaying one video signal over a monitor just like traditional monitors.

These and other objects and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 2 shows two video frames of two video signals.

FIG. 3 shows the even and odd fields of the two video signals shown in FIG. 2.

FIG. 4 shows a combined video frame of the two video signals shown in FIG. 2.

FIG. 5 shows the even and odd fields of the two video signals which are not synchronously received.

FIG. 6 shows a combined video frame of the two video signals shown in FIG. 5.

FIG. 7 shows an even field storage method for solving the asynchronous problem shown in FIG. 6.

FIG. 8 shows a combined video frame of the two video signals shown in FIG. 7.

FIG. 9 shows an odd field storage method for solving the asynchronous problem shown in FIG. 6.

FIG. 10 shows a combined video frame of the two video signals shown in FIG. 9.

FIG. 11 shows an even field data retrieval method for solving the asynchronous problem shown in FIG. 6.

FIG. 12 shows an odd field data retrieval method for solving the asynchronous problem shown in FIG. 6.

DETAILED DESCRIPTION OF THE PREFERRED EMBODIMENT

Figure 1:
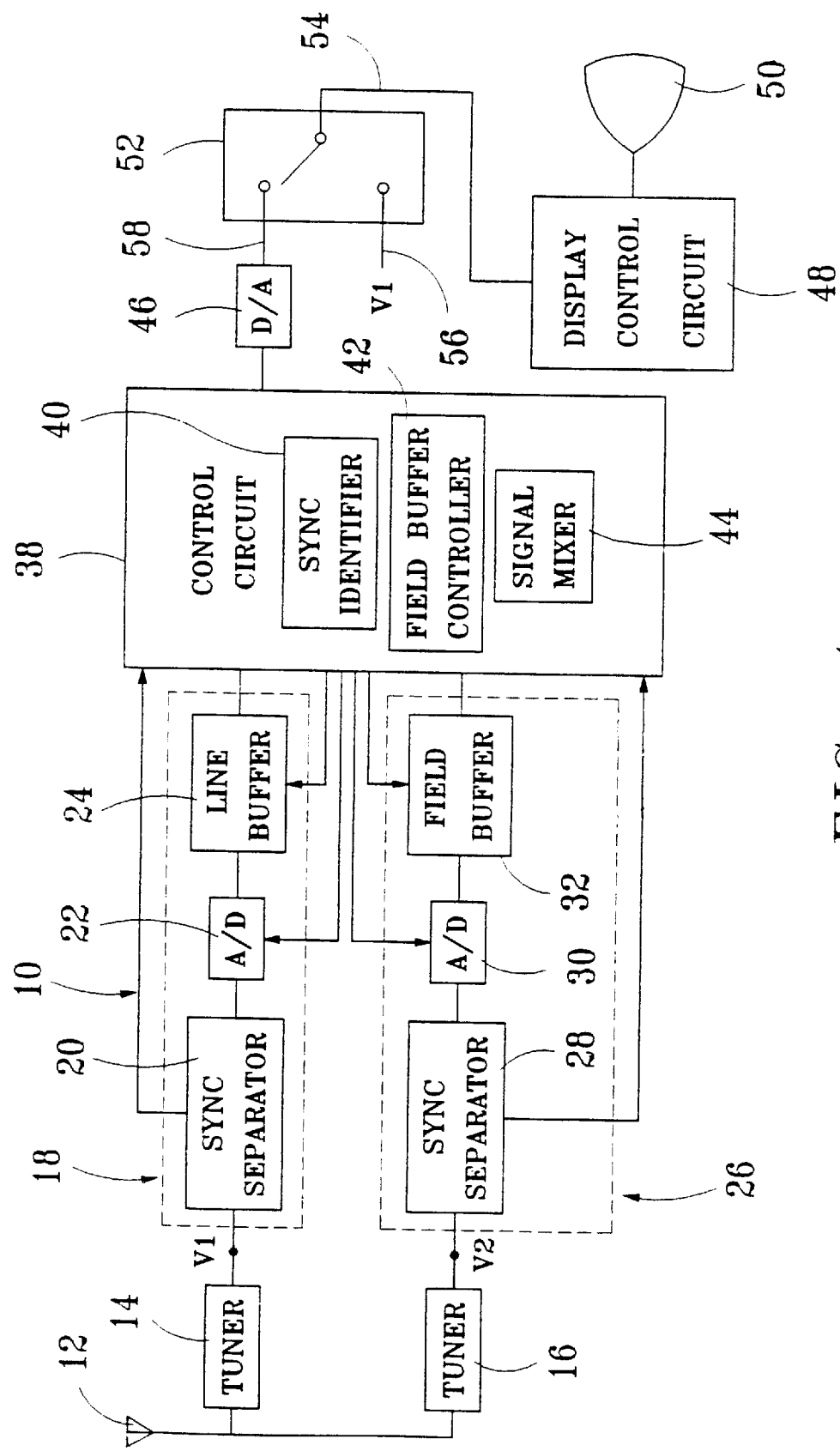
FIG. 1 is a function block diagram of a dual screen displaying system according to the present invention.

Please refer to FIGS. 1 to 4. FIG. 1 is a function block diagram of a dual screen displaying system 10 according to the present invention. FIG. 2 shows two video frames of two video signals V1 and V2. The video signal V1 comprises a plurality of line signals m1 to m8 and the video signal V2 comprises a plurality of line signals n1 to n8. These two video signals V1 and V2 shown here are used to simulate two NTSC video signals. FIG. 3 shows the even and odd fields, i.e. M2/M1 and N2/N1, of the two video signals V1 and V2. Each of the even or odd fields also comprises a predetermined number (four) of line signals. The displaying device 10 can be used for displaying the two video signals V1 and V2 on the left and right sides of a monitor. FIG. 4 shows a combined video frame 60 of the two video signals V1 and V2 generated by the displaying device 10.

The displaying device 10 comprises a tuner 14 for receiving wireless signals from an antenna 12 and generating a first video signal V1, a tuner 16 for receiving wireless signals from antenna 12 and generating a second video signal V2, a first digitizing circuit 18 for digitizing the first video signal V1, a second digitizing circuit 26 for digitizing the second video signal V2, a control circuit 38 for merging the outputs of the first and second digitizing circuits 18 and 26, a digital-to-analog converter 46 for converting the merged digitized signals back to a combined video signal, and a display control circuit 48 for displaying the combined video signal.

The firs t digitizing circuit 18 comprises a sync separator 20 for separating vertical and horizontal sync signals out of the first video signal V1, an analog-to-digital (A/D) converter 22 for converting each of the line signals m1 to m8 of the first video signal V1 into a digitized signal, and a line buffer 24 for storing the digitized signal.

The second digitizing circuit 26 comprises a sync separator 28 for separating vertical and horizontal sync signals out of the second video signal V2, an analog-to-digital (A/D) converter 30 for converting each of the line signals n1 to n8 of the second video signal V2 into a digitized signal, a field buffer 32 having a plurality of locations for sequentially storing the digitized signals converted from the line signals of one field (N1 or N2) of the second video signal V2. The field buffer 32 is a first-in/first-out (FIFO) buffer. The digitized signals of each field of the second video signal V2 can be stored into the field buffer 32 starting from a starting location of the field buffer 32.

The control circuit 38 is connected to the first digitizing circuit 18 and the second digitizing circuit 26 for properly storing and merging the outputs of the first and second digitizing circuits 18 and 26. It comprises a sync identifier 40, a field buffer controller 42, and a signal mixer 44.

The sync identifier 40 is used for identifying whether the incoming fields of the first video signal V1 and the second video signal V2 are synchronous (or the same field) according to the sync signals generated by the sync separators 20 and 28 of the first and the second digitizing circuits 18 & 26 and generating an output.

The field buffer controller 42 is used for controlling the storage of the digitized signals stored in the field buffer 32, wherein a first predetermined field (N1 or N2) of the second video signal V2 is stored into the field buffer 32 sequentially starting from a starting location of the field buffer 32, and a second predetermined field of the second video signal V2 is stored into the field buffer 32 according to the output of the sync identifier 40 so that the two fields of the first and second video signals V1 and V2 can be synchronously displayed over the monitor 50.

The signal mixer 44 is used for retrieving the digitized signal stored in the line buffer 24 of the first digitizing circuit 18 and one digitized signal out of the field buffer 32 starting from the starting location of the field buffer 32 in sequence to form a combined digitized signal.

The reason that a line buffer 24 is used for storing one digitized signal in the first digitizing circuit 18 while a field buffer 32 is used for storing all the digitized signals of one field in the second digitizing circuit 26 is because that the control circuit 38 will keep on merging the digitized signal stored in the line buffer 24 with a corresponding digitized signal stored in the field buffer 32 to form a combined digitized signal so that a combined field can be displayed over the monitor 50. In this manner, there is no need to used a field buffer in the first digitizing circuit 18 because each time when a digitized signal is stored in the line buffer 24, it is retrieved immediately by the control circuit 38.

The digital-to-analog (D/A) converter 46 connected to the signal mixer 44 of the control circuit 38 is used for converting the combined digitized signal into a combined line signal. And the display control circuit 48 connected to the D/A converter 46 is used for displaying the combined line signal over the monitor 50 so that the first and second video signals V1 and V2 can be displayed in sequence over the left and right sides of the monitor 50.

The displaying device 10 further comprises a display control switch 52 which has one output end 54 and two input ends 56 and 58. The output end 54 is connected to the display control circuit 48, the first input end 56 is connected to the D/A converter 46 for receiving the combined line signal and the second input end 58 is used for receiving the first video signal V1. The switch 52 is used for selecting one of the two input ends so the displaying device 10 can either display both the first and second video signals V1/V2 in sequence over the left and right sides of the monitor 50 or display only the first video signal V1 over the monitor 50. Such arrangement allows the first video signal V1 be directly displayed over the monitor 50 instead of going through the digitization process performed by the first digitizing circuit 18 when a user choose to display only one video signal over the monitor 50 instead two video signals in the same time.

The video signal V1 shown in FIG. 2 comprises two black line signals m2 and m3, and the rest of them a re white line signals. The video signal V2 also comprises two black line signals n2 and n3, and six white line signals. Each of the two video signals V1 and V2 comprises an even field and an odd field and these two fields are transmitted alternatively. For example, the two fields of the video signal V1 are transmitted or received in the following sequence:

M1, M2, M1, M2, M1, M2, M1, M2, . . .

And the two fields N1/N2 of the video signal V2 are also transmitted or received in the same manner. Since the two video signals V1 and V2 are generated from different sources such as two television stations, it is quite possible that the even and old fields of these two video signals V1 and V2 are received asynchronous by the first and second digitizing circuits 18 and 26. For example, a digitized signal stored in the line buffer 24 of the first digitizing circuit 18 may belong to an even field (M2) while the corresponding digitized signal stored in the field buffer 32 of the second digitizing circuit 26 belongs to an odd field (N1). Such asynchronous condition can generate serious consequence if not properly handled. FIGS. 3 and 4 will illustrate the process and result in merging two video signals (V1 and V2) which are synchronously displayed, and FIGS. 5 and 6 will explain the problem caused by merging two video signals (V1 and V2) which are asynchronously displayed.

Please refer to FIGS. 3 and 4. These two figures show that the two video signals V1 and V2 are synchronously merged and displayed. In FIG. 3, the odd and even fields M1/M2 of the first video signal V1 are merged and displayed with the odd and even fields N1/N2 of the second video signal V2. When merging and displaying the two odd fields M1 and N1, the digitized signals m1 and n1 will be merged into a combined digitized signal m1-n1 and displayed as the first line (m1-n1) over the video frame 60. And then the rest of the digitized signals will also be merged into combined digitized signals m3-n3, m5-n5, m7-n7 and displayed over frame 60 as the third, fifth, and seventh lines. After the two odd fields M1/N1 are merged and displayed, the two even fields M2/N2 will be merged into four combined digitized signals m2-n2, m4-n4, m6-n6, and m8-n8, and displayed as the second, fourth, sixth, and eighth lines of the frame 60. FIG. 4 shows that the four black digitized signals m2, m3, n2, and n3 are positioned in their original positions when compared with the two video frames shown in FIG. 2.

Please refer to FIGS. 5 and 6. These two figures show that the two video signals V1 and V2 are asynchronously merged and displayed. In FIG. 5, the odd and even fields M1/M2 of the first video signal V1 are merged and displayed with the even and odd fields N2/N1 of the second video signal V2. When merging and displaying the odd field M1 and the even N2, four combined digitized signals m1-n2, m3-n4, m5-n6, and m7-n8 are formed and displayed as the 1st, 3rd, 5th, and 7th lines of the video frame 62. And then the even fields M2 and the odd field N1 are merged into four combined digitized signals m2-n1, m4-n3, m6-n5, and m8-n7, and displayed as the second, fourth, sixth, and eighth lines of the frame 62. By checking the content of the right side of the frame 62, it can clearly be seen that the two black digitized signals n2 and n3 are improperly positioned. In fact, all the digitized signals (n1 to n8) shown on the right side of the frame 60 are improperly positioned. This problem is caused by asynchronously merging and displaying the two video signals V1 and V2.

Four methods have been devised to solve the asynchronous problem. The first method is illustrated in FIG. 7 and its result is shown in FIG. 8. FIG. 7 shows an even field storage method for solving the asynchronous problem shown in FIG. 6, and FIG. 8 shows a combined video frame 64 of the two video signals V1 and V2 shown in FIG. 7. The first method is to store all the digitized signals of the even field N2 one position behind their normal positions (starting from the starting location of the field buffer 32) in the field buffer 32 which forms a new even field N2', and store all the digitized signals of the odd field N1 in their normal positions. The contents of the new even field N2' and the odd field N1 are shown in FIG. 7. The video frame 64 shown in FIG. 8 is formed by merging the four fields M1/N2' and M2/N1. It can be seen that the digitized signals n1 to n7 of the second video signal V2 shown on the right side of the video frame 64 are aligned properly although the digitized signal n8 is discarded when storing the even field N2 into the field buffer 32. Discarding one line signal over the top or bottom end of a video frame in a real monitor is usually not noticeable by human eyes and thus will not cause too much problem.

The first method is implemented in the displaying device 10 in the following manner: when storing the digitized signals of the even field N2 of the second video signal V2 into the field buffer 32, if the output of the sync identifier 40 shows that the fields of the first and the second video signals V1 and V2 are synchronous, the field buffer controller 42 will control the input of the field buffer 32 so that the digitized signals of the even field N2 will be sequentially stored into the field buffer 32 starting from a location next to the starting location of the field buffer 32.

On the other hand, if the output of the sync identifier 40 shows that the fields of the first and the second video signals are not synchronous when storing the digitized signals of the even field N2 of the second video signal V2 into the field buffer 32, the field buffer controller 42 will control the input of the field buffer 32 so that the digitized signals of the even field N2 will be sequentially stored into the field buffer 32 starting from the starting location of the field buffer 32.

When storing the digitized signals of the even field N2 of the second video signal V2 into the field buffer 32, if the output of the sync identifier 40 shows that the fields of the first and the second video signals V1 and V2 are synchronous, that means the even field N2 to be stored will be merged and displayed asynchronously later on with the first video signal V1 by the control circuit 38, and this is just the condition described in FIGS. 5 and 6. That is the reason why the field buffer controller 42 will actuate the first method when the sync identifier 40 indicates that the fields of the first and the second video signals V1 and V2 are synchronous instead of asynchronous.

The second method is illustrated in FIG. 9 and its result is shown in FIG. 10. FIG. 9 shows an odd field storage method for solving the asynchronous problem shown in FIG. 6, and FIG. 10 shows a combined video frame 66 of the two video signals V1 and V2 shown in FIG. 7. The second method is to sequentially store the digitized signals of the second line signal n3 and its following line signals (n5, n7) of the odd field N1 into the field buffer 32 starting from the starting location of the field buffer which forms a new odd field N1' and store all the digitized signals of the even field N2 in their normal positions (starting from the starting location of the field buffer 32). The digitized signals of the first line signal n1 is then discarded.

When storing the odd field N1 into the field buffer 32, the field buffer controller 42 will control the input of the field buffer 32 to delay the storing of the digitized signals of the odd field for one input of a digitized signal so that the first digitized signal (n1) will be discarded and the rest digitized signals (n3, n5, n7) of the odd field are stored into the field buffer 32 starting from the starting location of the field buffer 32.

The contents of the even field N2 and the new odd field N1' are shown in FIG. 9. The video frame 66 shown in FIG. 10 is formed by merging the four fields M1/N2 and M2/N1'. It can be seen that the digitized signals n2 to n8 of the second video signal V2 shown on the right side of the video frame 66 are aligned properly although the digitized signal n1 is discarded when storing the odd field N1 into the field buffer 32. As mentioned before, discarding one line signal over the top or bottom end of a video frame in a real monitor is usually not noticeable by human eyes and thus will not cause too much problem.

The second method is implemented in the displaying device 10 in the following manner: when storing the digitized signals of the odd field N1 of the second video signal V2 into the field buffer 32, if the output of the sync identifier 40 shows that the fields of the first and the second video signals V1 and V2 are synchronous, the field buffer controller 42 will control the input of the field buffer 32 so that the first digitized signal (n1) of the odd field N1 will be discarded, and the second digitized signal (n3) and the rest of the digitized signals (n5, n7) of the odd field N1 are stored sequentially into the field buffer 32 starting from the starting location of the field buffer 32.

On the other hand, if the output of the sync identifier 40 shows that the fields of the first and the second video signals are not synchronous when storing the digitized signals of the odd field N1 of the second video signal into the field buffer 32, the field buffer controller 42 will control the input of the field buffer 32 so that the digitized signals of the odd field N1 will be sequentially stored into the field buffer 32 starting from the starting location of the field buffer 32.

Again, when storing the digitized signals of the odd field N1 of the second video signal V2 into the field buffer 32, if the output of the sync identifier 40 shows that the fields of the first and the second video signals V1 and V2 are synchronous, that means the odd field N1 will be merged and displayed asynchronously later on with the first video signal V1 by the control circuit 38, and this is just the condition described in FIGS. 5 and 6. That is the reason why the field buffer controller 42 will actuate the second method when the sync identifier 40 indicates that the fields of the first and the second video signals V1 and V2 are synchronous instead of asynchronous.

The above mentioned two methods are storage control methods which control the storing of the even field N1 or the odd field N2 into the field buffer 32 to solve the asynchronous problem. The following two methods are storage retrieval methods which control the retrieving of the even field N1 or the odd field N2 from the field buffer 32 to solve the asynchronous problem. All the digitized signals of the even field N2 or the odd field N1 are stored into the field buffer 32 starting from the starting location of the field buffer 32 in these two methods. The function of the field buffer controller 42 is used for controlling the output of the digitized signals of the even or odd field of the second video signal V2 from the field buffer 32 according to the output of the sync identifier so that the two fields N1 and N2 of the second video signal V2 can be synchronously displayed over the monitor 50.

The functions of the field buffer controller 42 and the signal mixer 44 shown in FIG. 1 are changed when implementing the following two storage retrieval methods. The field buffer controller 42 is used for controlling the retrieval of the digitized signals stored in the field buffer 32, wherein a first predetermined field (N1 or N2) of the second video signal V2 stored in the field buffer 32 is retrieved sequentially starting from the starting location of the field buffer 32, and a second predetermined field of the second video signal V2 stored in the field buffer 32 is retrieved according to the output of the sync identifier 40 so that the two fields of the first and second video signals V1 and V2 can be synchronously displayed over the monitor 50. And the signal mixer 44 is used for retrieving the digitized signal stored in the line buffer 24 of the first digitizing circuit 18 and one digitized signal from the field buffer 32 of the second digitizing circuit 26 in sequence to form a combined digitized signal. And the retrieval of the digitized signal from the field buffer 32 by the signal mixer 44 is under the control of the field buffer controller 42.

Before the control circuit 38 starts retrieving the first digitized signal out of the field buffer 32, if the output of the sync identifier 40 shows that the fields of the first and the second video signals V1 and V2 are synchronous, that means the field of the first digitized signal stored in the field buffer 32 is synchronous with the digitized signal stored in the line buffer 24, then these two digitized signals will be displayed synchronously later on. On the other hand, if the output of the sync identifier 40 shows that the fields of the first and the second video signals V1 and V2 are asynchronous, that means the field of the first digitized signal stored in the field buffer 32 is asynchronous with the digitized signal stored in the line buffer 24. In this case the control circuit 38 should perform some actions to synchronize the video signals V1 and V2. This will be described in FIGS. 11 and 12.

FIG. 11 shows an even field data retrieval method for solving the asynchronous problem shown in FIG. 6. This method is to delay the output of the digitized signals (n2, n4, ...) of the even field N2 stored in the field buffer 32 for one output of a digitized signal, and outputs all the digitized signals of the odd field N1 in their normal sequence. The sequence of the data output from the even field N2 and from the odd field N1 are shown in FIG. 11, and the resulting video frame is the same as the video frame 64 shown in FIG. 8. It can be seen that the digitized signals n1 to n7 of the second video signal V2 shown on the right side of the video frame 64 are aligned properly although the digitized signal n8 is discarded when retrieving the even field N2 from the field buffer 32.

This method is implemented in the displaying device 10 in the following manner: when retrieving the digitized signals of the even field N2 of the second video signal V2 from the field buffer 32, if the output of the sync identifier 40 shows that the fields of the first and the second video signals V1 and V2 are not synchronous, the field buffer controller 42 will control the output of the field buffer 32 so that the output of the digitized signals of the even field N2 stored in the field buffer 32 will be delayed for one output of a digitized signal.

On the other hand, if the output of the sync identifier 40 shows that the fields of the first and the second video signals V1 and V2 are synchronous when retrieving the digitized signals of the even field N2 from the field buffer 32, the field buffer controller 42 will control the output of the field buffer 32 so that all the digitized signals of the even field N2 will be sequentially retrieved from the field buffer 32 starting from the starting location of the field buffer 32.

FIG. 12 shows an odd field data retrieval method for solving the asynchronous problem shown in FIG. 6. This method is to sequentially retrieve only the digitized signals of the second line signal (n3) and its following line signals (n5, ...) of the odd field N1 out of the field buffer 32, and outputs all the digitized signals of the even field N2 in their normal sequence. The sequence of the data output from the even field N2 and from the odd field N1 are shown in FIG. 12, and the resulting video frame is the same as the video frame 66 shown in FIG. 10. It can be seen that the digitized signals n2 to n8 of the second video signal V2 shown on the right side of the video frame 66 are aligned properly although the digitized signal n1 is discarded when retrieving the odd field N1 from the field buffer 32.

This method is implemented in the displaying device 10 in the following manner: when retrieving the digitized signals of the odd field N1 of the second video signal V2 from the field buffer 32, if the output of the sync identifier 40 shows that the fields of the first and the second video signals V1 and V2 are not synchronous, the field buffer controller 42 will control the output of the field buffer 32 so that the digitized signal (n3) of the second line signal and the rest digitized signals (n5, . . . ) of the odd field N1 will be sequentially retrieved out of the field buffer 32 and the digitized signal (n1) stored in the starting location of the field buffer will be ignored.

On the other hand, if the output of the sync identifier 40 shows that the fields of the first and the second video signals V1 and V2 are synchronous when retrieving the digitized signals of the odd field N1 of the second video signal V2 from the field buffer 32, the field buffer controller 42 will control the output of the field buffer 32 so that all the digitized signals of the odd field N1 will be sequentially retrieved from the field buffer 32 starting from the starting location of the field buffer 32.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A displaying device for displaying a first video signal and a second video signal on the left and right sides of a monitor, each of the video signals comprising an even field and an odd field which form a video frame when the two fields are displayed together, each of the two fields comprising a predetermined number of line signals, the device comprising:

(1) a first digitizing circuit comprising:
   (a) a sync separator for separating sync signals out of the first video signal,
   (b) an analog-to-digital (A/D) converter for converting each line signal of the first video signal into a digitized signal, and
   (c) a line buffer for storing the digitized signal;

(2) a second digitizing circuit comprising:
   (a) a sync separator for separating sync signals out of the second video signal,
   (b) an analog-to-digital (A/D) converter for converting each line signal of the second video signal into a digitized signal,
   (c) a field buffer having a plurality of locations for sequentially storing the digitized signals converted from the line signals of one field of the second video signal, (3) a control circuit connected to the first and the second digitizing circuits comprising:
   (a) a sync identifier for identifying whether the incoming fields of the first and the second video signals are synchronous according to the sync signals generated by the sync separators of the first and the second digitizing circuits and generating an output;
   (b) a field buffer controller for controlling the storage of the digitized signals stored in the field buffer, wherein a first predetermined field of the second video signal is stored into the field buffer sequentially starting from a starting location of the field buffer, and a second predetermined field of the second video signal is stored into the field buffer according to the output of the sync identifier so that the two fields of the first and second video signals can be synchronously displayed over the monitor; and
   (c) a signal mixer for retrieving the digitized signal stored in the line buffer of the first digitizing circuit and one digitized signal out of the field buffer starting from the starting location of the field buffer in sequence to form a combined digitized signal;

(4) a digital-to-analog (D/A) converter for converting the combined digitized signal into a combined line signal; and (5) a display control circuit connected to the D/A converter for displaying the combined line signal over the monitor whereby the first and second video signals are displayed in sequence over the left and right sides of the monitor;

wherein the first predetermined field is an odd field and the second predetermined field is an even field, and wherein upon storing the digitized signals of the even field into the field buffer, if the output of the sync identifier shows that the fields of the first and the second video signals are synchronous, the field buffer controller will control the input of the field buffer so that the digitized signals of the even field will be sequentially stored into the field buffer starting from a location next to the starting location of the field buffer.

2. The displaying device of claim 1 further comprising a display control switch having an output end connected to the display control circuit, a first input end connected to the D/A converter for receiving the combined line signal and a second input end for receiving the first video signal, said switch being used for selecting one of the two input ends whereby the displaying device can either display both the first and second video signals in sequence over the left and right sides of the monitor or display only the first video signal over the monitor.

3. The displaying device of claim 1 wherein the field buffer is a first-in/first-out buffer.

4. A displaying device for displaying a first video signal and a second video signal on the left and right sides of a monitor, each of the video signals comprising an even field and an odd field which form a video frame when the two fields are displayed together, each of the two fields comprising a predetermined number of line signals, the device comprising:

(1) a first digitizing circuit comprising:
   (a) a sync separator for separating sync signals out of the first video signal,
   (b) an analog-to-digital (A/D) converter for converting each line signal of the first video signal into a digitized signal, and
   (c) a line buffer for storing the digitized signal;

(2) a second digitizing circuit comprising:
   (a) a sync separator for separating sync signals out of the second video signal,
   (b) an analog-to-digital (A/D) converter for converting each line signal of the second video signal into a digitized signal,
   (c) a field buffer having a plurality of locations for sequentially storing the digitized signals converted from the line signals of one field of the second video signal starting from a starting location of the field buffer;

(3) a control circuit connected to the first and the second digitizing circuits comprising:
   (a) a sync identifier for identifying whether the incoming fields of the first and the second video signals are synchronous according to the sync signals generated by the sync separators of the first and the second digitizing circuits and generating an output;
   (b) a field buffer controller for controlling the retrieval of the digitized signals stored in the field buffer, wherein a first predetermined field of the second video signal stored in the field buffer is retrieved sequentially starting from the starting location of the field buffer, and a second predetermined field of the second video signal stored in the field buffer is retrieved according to the output of the sync identifier so that the two fields of the first and second video signals can be synchronously displayed over the monitor; and (c) a signal mixer for retrieving the digitized signal stored in the line buffer of the first digitizing circuit and one digitized signal from the field buffer of the second digitizing circuit in sequence to form a combined digitized signal;

(4) a digital-to-analog (D/A) converter for converting the combined digitized signal into a combined line signal; and (5) a display control circuit connected to the D/A converter for displaying the combined line signal over the monitor whereby the first and second video signals are displayed in sequence over the left and right sides of the monitor;

wherein the first predetermined field is an odd field and the second predetermined field is an even field, and wherein upon retrieving the digitized signals of the even field from the field buffer, if the output of the sync identifier shows that the fields of the first and the second video signals are not synchronous, the field buffer controller will control the output of the field buffer so that the output of the digitized signals of the even field stored in the field buffer will be delayed for one output of a digitized signal.

5. The displaying device of claim 4 further comprising a display control switch having an output end connected to the display control circuit, a first input end connected to the D/A converter for receiving the combined line signal and a second input end for receiving the first video signal, said switch being used for selecting one of the two input ends whereby the displaying device can either display both the first and second video signals in sequence over the left and right sides of the monitor or display only the first video signal over the monitor.

6. The displaying device of claim 4 wherein the field buffer is a first-in/first-out buffer.

7. A method for displaying a first video signal and a second video signal on the left and right sides of a monitor, each of the video signals comprising an even field and an odd field which form a video frame when the two fields of each video signal are displayed together, each of the two fields comprising a predetermined number of line signals, the method comprising the following steps of:

(1) separating sync signals out of the first video signal;

(2) separating sync signals out of the second video signal;

(3) identifying whether the incoming fields of the first and the second video signals are synchronous according to the sync signals separated from the first and the second video signals and generating an output;

(4) digitizing each line signal of the first video signal into a digitized signal and storing the digitized signal in a line buffer;

(5) digitizing each line signal of each field of the second video signal into a digitized signal;

(6) storing the digitized signals of a first predetermined field of the second video signal into a field buffer having a plurality of locations sequentially starting from a starting location of the field buffer when receiving said predetermined field of the second video signal;

(7) storing the digitized signals of a second predetermined field of the second video signal into the field buffer according to the output of the sync identifier so that the second predetermined field of the second video signal can be synchronously displayed with the first video signal over the monitor;

(8) retrieving the digitized signal stored in the line buffer and retrieving one digitized signal out of the field buffer starting from the starting location of the field buffer in sequence to form a combined digitized signal;

(9) converting the combined digitized signal into a combined line signal; and

(10) displaying the combined line signal over the monitor whereby the first and second video signals are displayed in sequence over the left and right sides of the monitor;

wherein the first predetermined field is an odd field and the second predetermined field is an even field, and wherein upon storing the digitized signals of the even field into the field buffer, if the output of the sync identifier shows that the fields of the first and the second video signals are synchronous, the digitized signals of the even field will be stored sequentially into the field buffer starting from a location next to the starting location of the field buffer.

8. A method for displaying a first video signal and a second video signal on the left and right sides of a monitor, each of the video signals comprising of an even field and an odd field which form a video frame when the two fields of each video signal are displayed together, each of the two fields comprising a predetermined number of line signals, the method comprising the following steps of:

(1) separating sync signals out of the first video signal;

(2) separating sync signals out of the second video signal;

(3) identifying whether the incoming fields of the first and the second video signals are synchronous according to the sync signals separated from the first and the second video signals and generating an output;

(4) digitizing each line signal of the first video signal into a digitized signal and storing the digitized signal in a line buffer;

(5) digitizing each line signal of each field of the second video signal into a digitized signal;

(6) storing the digitized signals of each field of the second video signal into a field buffer having a plurality of locations sequentially starting from a starting location of the field buffer;

(7) retrieving the digitized signal stored in the line buffer and retrieving one digitized signal out of the field buffer in sequence to form a combined digitized signal; the digitized signals of a first predetermined field of the second video signal being retrieved sequentially starting from the starting location of the field buffer; the digitized signals of a second predetermined field of the second video signal being retrieved sequentially according to the output of the sync identifier so that the second predetermined field of the second video signal can be synchronously displayed with the first video signal over the monitor;

(8) converting the combined digitized signal into a combined line signal; and (9) displaying the combined line signal over the monitor whereby the first and second video signals are displayed in sequence over the left and right sides of the monitor;

wherein the first predetermined field is an odd field and second predetermined field is an even field, and wherein upon retrieving the digitized signals of the even field out of the field buffer, if the output of the sync identifier shows that the fields of the first and the second video signals are not synchronous, the retrieval of the digitized signals of the even field stored in the field buffer will be delayed for one output of a digitized signal.

9. A displaying device for displaying a first video signal and a second video signal on the left and right sides of a monitor, each of the video signals comprising an even field and an odd field which form a video frame when the two fields are displayed together, each of the two fields comprising a predetermined number of line signals, the device comprising:

(1) a first digitizing circuit comprising:
   (a) a sync separator for separating sync signals out of the first video signal,
   (b) an analog-to-digital (A/D) converter for converting each line signal of the first video signal into a digitized signal, and
   (c) a line buffer for storing the digitized signal;
(2) a second digitizing circuit comprising:
   (a) a sync separator for separating sync signals out of the second video signal,
   (b) an analog-to-digital (A/D) converter for converting each line signal of the second video signal into a digitized signal,
   (c) a field buffer having a plurality of locations for sequentially storing the digitized signals converted from the line signals of one field of the second video signal,
(3) a control circuit connected to the first and the second digitizing circuits comprising:
   (a) a sync identifier for identifying whether the incoming fields of the first and the second video signals are synchronous according to the sync signals generated by the sync separators of the first and the second digitizing circuits and generating an output;
   (b) a field buffer controller for controlling the storage of the digitized signals stored in the field buffer, wherein a first predetermined field of the second video signal is stored into the field buffer sequentially starting from a starting location of the field buffer, and a second predetermined field of the second video signal is stored into the field buffer according to the output of the sync identifier so that the two fields of the first and second video signals can be synchronously displayed over the monitor; and
   (c) a signal mixer for retrieving the digitized signal stored in the line buffer of the first digitizing circuit and one digitized signal out of the field buffer starting from the starting location of the field buffer in sequence to form a combined digitized signal;
(4) a digital-to-analog (D/A) converter for converting the combined digitized signal into a combined line signal; and
(5) a display control circuit connected to the D/A converter for displaying the combined line signal over the monitor whereby the first and second video signals are displayed in sequence over the left and right sides of the monitor;

wherein the first predetermined field is an even field and the second predetermined field is an odd field, and wherein upon storing the digitized signals of the odd field into the field buffer, if the output of the sync identifier shows that the fields of the first and the second video signals are synchronous, the field buffer controller will control the input of the field buffer to delay the storing of the odd field's digitized signals for one input so that the second digitized signal and the rest of the digitized signals of the odd field are stored sequentially into the field buffer starting from the starting location of the field buffer.

10. A displaying device for displaying a first video signal and a second video signal on the left and right sides of a monitor, each of the video signals comprising an even field and an odd field which form a video frame when the two fields are displayed together, each of the two fields comprising a predetermined number of line signals, the device comprising:

(1) a first digitizing circuit comprising:
   (a) a sync separator for separating sync signals out of the first video signal,
   (b) an analog-to-digital (A/D) converter for converting each line signal of the first video signal into a digitized signal, and
   (c) a line buffer for storing the digitized signal;
(2) a second digitizing circuit comprising:
   (a) a sync separator for separating sync signals out of the second video signal,
   (b) an analog-to-digital (A/D) converter for converting each line signal of the second video signal into a digitized signal,
   (c) a field buffer having a plurality of locations for sequentially storing the digitized signals converted from the line signals of one field of the second video signal,
(3) a control circuit connected to the first and the second digitizing circuits comprising:
   (a) a sync identifier for identifying whether the incoming fields of the first and the second video signals are synchronous according to the sync signals generated by the sync separators of the first and the second digitizing circuits and generating an output;
   (b) a field buffer controller for controlling the storage of the digitized signals stored in the field buffer, wherein a first predetermined field of the second video signal is stored into the field buffer sequentially starting from a starting location of the field buffer, and a second predetermined field of the second video signal is stored into the field buffer according to the output of the sync identifier so that the two fields of the first and second video signals can be synchronously displayed over the monitor; and
   (c) a signal mixer for retrieving the digitized signal stored in the line buffer of the first digitizing circuit and one digitized signal out of the field buffer starting from the starting location of the field buffer in sequence to form a combined digitized signal;
(4) a digital-to-analog (D/A) converter for converting the combined digitized signal into a combined line signal; and
(5) a display control circuit connected to the D/A converter for displaying the combined line signal over the monitor whereby the first and second video signals are displayed in sequence over the left and right sides of the monitor;

wherein upon storing the digitized signals of the second predetermined field into the field buffer, if the output of the sync identifier shows that the fields of the first and the second video signals are not synchronous, the field buffer controller will control the input of the field buffer so that the digitized signals of the predetermined field will be sequentially stored into the field buffer starting from the starting location of the field buffer.

11. A displaying device for displaying a first video signal and a second video signal on the left and right sides of a monitor, each of the video signals comprising an even field and an odd field which form a video frame when the two fields are displayed together, each of the two fields comprising a predetermined number of line signals, the device comprising:

(1) a first digitizing circuit comprising:
   (a) a sync separator for separating sync signals out of the first video signal,
   (b) an analog-to-digital (A/D) converter for converting each line signal of the first video signal into a digitized signal, and
   (c) a line buffer for storing the digitized signal;

(2) a second digitizing circuit comprising:
   (a) a sync separator for separating sync signals out of the second video signal,
   (b) an analog-to-digital (A/D) converter for converting each line signal of the second video signal into a digitized signal,
   (c) a field buffer having a plurality of locations for sequentially storing the digitized signals converted from the line signals of one field of the second video signal starting from a starting location of the field buffer;

(3) a control circuit connected to the first and the second digitizing circuits comprising:
   (a) a sync identifier for identifying whether the incoming fields of the first and the second video signals are synchronous according to the sync signals generated by the sync separators of the first and the second digitizing circuits and generating an output;
   (b) a field buffer controller for controlling the retrieval of the digitized signals stored in the field buffer, wherein a first predetermined field of the second video signal stored in the field buffer is retrieved sequentially starting from the starting location of the field buffer, and a second predetermined field of the second video signal stored in the field buffer is retrieved according to the output of the sync identifier so that the two fields of the first and second video signals can be synchronously displayed over the monitor; and
   (c) a signal mixer for retrieving the digitized signal stored in the line buffer of the first digitizing circuit and one digitized signal from the field buffer of the second digitizing circuit in sequence to form a combined digitized signal;

(4) a digital-to-analog (D/A) converter for converting the combined digitized signal into a combined line signal; and (5) a display control circuit connected to the D/A converter for displaying the combined line signal over the monitor whereby the first and second video signals are displayed in sequence over the left and right sides of the monitor;

wherein the first predetermined field is an even field and the second predetermined field is an odd field, and wherein upon retrieving the digitized signals of the odd field from the field buffer, if the output of the sync identifier shows that the fields of the first and the second video signals are not synchronous, the field buffer controller will control the output of the field buffer so that the digitized signal stored in a location next to the starting location of the field and its following digitized signals of the odd field will be sequentially retrieved out of the field buffer.

12. A displaying device for displaying a first video signal and a second video signal on the left and right sides of a monitor, each of the video signals comprising an even field and an odd field which form a video frame when the two fields are displayed together, each of the two fields comprising a predetermined number of line signals, the device comprising:

(1) a first digitizing circuit comprising:
   (a) a sync separator for separating sync signals out of the first video signal,
   (b) an analog-to-digital (A/D) converter for converting each line signal of the first video signal into a digitized signal, and
   (c) a line buffer for storing the digitized signal;

(2) a second digitizing circuit comprising:
   (a) a sync separator for separating sync signals out of the second video signal,
   (b) an analog-to-digital (A/D) converter for converting each line signal of the second video signal into a digitized signal,
   (c) a field buffer having a plurality of locations for sequentially storing the digitized signals converted from the line signals of one field of the second video signal starting from a starting location of the field buffer;

(3) a control circuit connected to the first and the second digitizing circuits comprising:
   (a) a sync identifier for identifying whether the incoming fields of the first and the second video signals are synchronous according to the sync signals generated by the sync separators of the first and the second digitizing circuits and generating an output;
   (b) a field buffer controller for controlling the retrieval of the digitized signals stored in the field buffer, wherein a first predetermined field of the second video signal stored in the field buffer is retrieved sequentially starting from the starting location of the field buffer, and a second predetermined field of the second video signal stored in the field buffer is retrieved according to the output of the sync identifier so that the two fields of the first and second video signals can be synchronously displayed over the monitor; and
   (c) a signal mixer for retrieving the digitized signal stored in the line buffer of the first digitizing circuit and one digitized signal from the field buffer of the second digitizing circuit in sequence to form a combined digitized signal;

(4) a digital-to-analog (D/A) converter for converting the combined digitized signal into a combined line signal; and (5) a display control circuit connected to the D/A converter for displaying the combined line signal over the monitor whereby the first and second video signals are displayed in sequence over the left and right sides of the monitor;

wherein upon retrieving the digitized signals of the second predetermined field from the field buffer, if the output of the sync identifier shows that the fields of the first and the second video signals are synchronous, the field buffer controller will control the output of the field buffer so that the digitized signals of the predetermined field will be sequentially retrieved from the field buffer starting from the starting location of the field buffer.

13. A method for displaying a first video signal and a second video signal on the left and right sides of a monitor, each of the video signals comprising an even field and an odd field which form a video frame when the two fields of each video signal are displayed together, each of the two fields comprising a predetermined number of line signals, the method comprising the following steps of:

(1) separating sync signals out of the first video signal;

(2) separating sync signals out of the second video signal;

(3) identifying whether the incoming fields of the first and the second video signals are synchronous according to the sync signals separated from the first and the second video signals and generating an output;

(4) digitizing each line signal of the first video signal into a digitized signal and storing the digitized signal in a line buffer;

(5) digitizing each line signal of each field of the second video signal into a digitized signal;

(6) storing the digitized signals of a first predetermined field of the second video signal into a field buffer having a plurality of locations sequentially starting from a starting location of the field buffer when receiving said predetermined field of the second video signal;

(7) storing the digitized signals of a second predetermined field of the second video signal into the field buffer according to the output of the sync identifier so that the second predetermined field of the second video signal can be synchronously displayed with the first video signal over the monitor;

(8) retrieving the digitized signal stored in the line buffer and retrieving one digitized signal out of the field buffer starting from the starting location of the field buffer in sequence to form a combined digitized signal;

(9) converting the combined digitized signal into a combined line signal; and

(10) displaying the combined line signal over the monitor whereby the first and second video signals are displayed in sequence over the left and right sides of the monitor;

wherein the first predetermined field is an even field and the second predetermined field is an odd field, and wherein upon storing the digitized signals of the odd field into the field buffer, if the output of the sync identifier shows that the fields of the first and the second video signals are synchronous, the storing of the odd field's digitized signals is delayed for one input so that the second digitized signal and the rest of the digitized signals of the odd field are stored sequentially into the field buffer starting from the starting location of the field buffer.

14. A method for displaying a first video signal and a second video signal on the left and right sides of a monitor, each of the video signals comprising an even field and an odd field which form a video frame when the two fields of each video signal are displayed together, each of the two fields comprising a predetermined number of line signals, the method comprising the following steps of:

(1) separating sync signals out of the first video signal;

(2) separating sync signals out of the second video signal;

(3) identifying whether the incoming fields of the first and the second video signals are synchronous according to the sync signals separated from the first and the second video signals and generating an output;

(4) digitizing each line signal of the first video signal into a digitized signal and storing the digitized signal in a line buffer;

(5) digitizing each line signal of each field of the second video signal into a digitized signal;

(6) storing the digitized signals of a first predetermined field of the second video signal into a field buffer having a plurality of locations sequentially starting from a starting location of the field buffer when receiving said predetermined field of the second video signal;

(7) storing the digitized signals of a second predetermined field of the second video signal into the field buffer according to the output of the sync identifier so that the second predetermined field of the second video signal can be synchronously displayed with the first video signal over the monitor;

(8) retrieving the digitized signal stored in the line buffer and retrieving one digitized signal out of the field buffer starting from the starting location of the field buffer in sequence to form a combined digitized signal;

(9) converting the combined digitized signal into a combined line signal; and

(10) displaying the combined line signal over the monitor whereby the first and second video signals are displayed in sequence over the left and right sides of the monitor;

wherein upon storing the digitized signals of the second predetermined field into the field buffer, if the output of the sync identifier shows that the fields of the first and the second video signals are not synchronous, the digitized signals of the second predetermined field are stored sequentially into the field buffer starting from the starting location of the field buffer.

15. A method for displaying a first video signal and a second video signal on the left and right sides of a monitor, each of the video signals comprising of an even field and an odd field which form a video frame when the two fields of each video signal are displayed together, each of the two fields comprising a predetermined number of line signals, the method comprising the following steps of:

(1) separating sync signals out of the first video signal;

(2) separating sync signals out of the second video signal;

(3) identifying whether the incoming fields of the first and the second video signals are synchronous according to the sync signals separated from the first and the second video signals and generating an output;

(4) digitizing each line signal of the first video signal into a digitized signal and storing the digitized signal in a line buffer;

(5) digitizing each line signal of each field of the second video signal into a digitized signal;

(6) storing the digitized signals of each field of the second video signal into a field buffer having a plurality of locations sequentially starting from a starting location of the field buffer;

(7) retrieving the digitized signal stored in the line buffer and retrieving one digitized signal out of the field buffer in sequence to form a combined digitized signal; the digitized signals of a first predetermined field of the second video signal being retrieved sequentially starting from the starting location of the field buffer; the digitized signals of a second predetermined field of the second video signal being retrieved sequentially according to the output of the sync identifier so that the second predetermined field of the second video signal can be synchronously displayed with the first video signal over the monitor;

(8) converting the combined digitized signal into a combined line signal; and (9) displaying the combined line signal over the monitor whereby the first and second video signals are displayed in sequence over the left and right sides of the monitor;

wherein the first predetermined field is an even field and the second predetermined field is an odd field, and wherein upon retrieving the digitized signals of the odd field from the field buffer, if the output of the sync identifier shows that the fields of the first and the second video signals are not synchronous, the digitized signal stored in a location next to the starting location of the field and its following digitized signals of the odd field will be sequentially retrieved out of the field buffer.

* * * * *